United States Patent [19]
Batty et al.

[11] Patent Number: 5,717,023
[45] Date of Patent: Feb. 10, 1998

[54] SOLID POLYMERIC PRODUCTS AND THEIR USE

[75] Inventors: Norman Stewart Batty; Martin William Whitley, both of West Yorkshire; Adrian Swinburn Allen, North Yorkshire; Gillian Mary Moody, West Yorkshire, all of United Kingdom

[73] Assignee: Allied Colloids Limited, West Yorkshire, United Kingdom

[21] Appl. No.: 532,760

[22] PCT Filed: Feb. 10, 1995

[86] PCT No.: PCT/GB95/00282

§ 371 Date: Oct. 11, 1995

§ 102(e) Date: Oct. 11, 1995

[87] PCT Pub. No.: WO95/21796

PCT Pub. Date: Aug. 17, 1995

[30] Foreign Application Priority Data

Feb. 11, 1994 [GB] United Kingdom ............... 9402717

[51] Int. Cl.$^6$ .............................. C02F 1/52; C02F 1/56
[52] U.S. Cl. ............... 524/555; 524/922; 524/377; 524/378; 524/394; 210/734; 525/187; 525/530
[58] Field of Search ................... 525/187, 530; 524/922, 377, 378, 394, 555; 210/734

[56] References Cited

U.S. PATENT DOCUMENTS

| 3,839,500 | 10/1974 | Dexter | 260/874 |
| 3,891,592 | 6/1975 | Chauvel et al. | 260/29.7 |
| 3,960,584 | 6/1976 | Savage | 524/922 |
| 4,389,506 | 6/1983 | Hassell, Jr. | 524/377 |
| 4,438,015 | 3/1984 | Huber | 524/378 |
| 5,171,781 | 12/1992 | Farrar et al. | 524/555 |

FOREIGN PATENT DOCUMENTS

| 202 780 | 4/1986 | European Pat. Off. | C02F 1/56 |
| 255 283 | 7/1987 | European Pat. Off. | C02F 1/52 |
| 326 382 | 1/1989 | European Pat. Off. | C08J 3/12 |
| 401 044 | 6/1990 | European Pat. Off. | C08J 3/24 |
| 26 16 639 | 10/1976 | Germany | C09B 67/00 |
| 57-49643 | 3/1982 | Japan | C08L 33/26 |
| 57-162610 | 10/1982 | Japan | B01D 21/01 |

Primary Examiner—Andrew E. C. Merriam
Attorney, Agent, or Firm—Sughrue, Mion, Zinn, Macpeak & Seas, PLLC

[57] ABSTRACT

A flocculant, viscosifier or other water soluble or water swellable particulate polymer is formulated as a block having a dimension of at least 10 mm and which comprises a wax matrix in which the polymer particles are dispersed. The block can be made by blending polymer powder with the molten wax matrix and cooling and solidifying it. The block is of particular value for releasing flocculant into a flowing stream of suspension.

22 Claims, No Drawings

SOLID POLYMERIC PRODUCTS AND THEIR USE

This invention relates to solid products which comprise water soluble or water swellable polymeric particles.

In order to utilise the polymeric material in such particles, for instance as viscosifier or flocculant, it is usual practice first to expose the particles to water under conditions that allow full hydration of the particles either to form a solution of the polymeric material or to form a suspension of highly swollen particles in water. Various problems can arise in handling the polymer particles prior to and during the exposure to the water.

For instance the particles may tend to acquire a gel layer upon initial exposure, which gel layer may inhibit access of water and cause aggregation, thus interfering with dissolution or swelling of the particles. This problem can be minimised in many instances by appropriate selection of the exposure conditions but in some instances it is not possible to optimise these. It is known to apply coatings of various materials to the particles in order to try to minimise this problem. These problems arise even when the polymer particles are relatively coarse (e.g. 100 µm to 800 µm).

Particular problems arise in the handling and exposure to dissolution water of polymer particles which are fines, below 100 µm and often below 70 µm.

Conventional methods for making dry water soluble or water swellable polymer particles as a powder (for instance gel polymerisation followed by comminution and drying or reverse phase bead polymerisation) tend to result in a product that contains some of these fines. Handling a powder product which consists of or contains a significant amount of such fines is undesirable since they can impart undesirable environmental, flow and dissolution effects. Accordingly it is conventional to separate unwanted fines from the coarser particles, and it is then necessary to find a use for them. Commonly they are recycled into the process, often after aggregation by contact with moisture, and various proposals have been made for bonding them into aggregates using a small amount of a bonding agent (see for instance EP-A-326382 and EP-A-401044). It is also known that coating the particles can facilitate dispersion into water.

In U.S. Pat. No. 3,839,500 polymer particles are coated with 0.1 to 20%, usually 0.1 to 10%, by weight polyalkylene glycol. It is mentioned that the process results in reducing the proportion of fines by agglomeration to form larger particles. The glycol is generally applied from a solution but it is mentioned that the coating can be achieved by mixing the particles with solid granulated polyalkylene glycol in a rotating drum or blender at a temperature sufficient to melt the glycol, the blended product is then cooled while mixing, and the cooled product is discharged from the blender.

In U.S. Pat. No. 4,389,506 fines in a polyvinyl alcohol powder are agglomerated by contacting the powder with 0.5 to 4% molten polyethylene glycol. Other processes of coating or agglomerating polymer particles are described in DE-A2616639, JP-A-57049643 and JP-A-57162610. In U.S. Pat. No. 3,891,592 polyalkylene glycol is included in the aqueous phase of an oil-in-water polymerisation emulsion so as to agglomerate the emulsion particles.

Although it is conventional practice to dissolve water soluble particulate polymeric flocculant in water to form a dilute aqueous solution of the polymer and then to add this solution to the suspension that is to be flocculated, other ways of administering the polymeric flocculant to the suspension are known. In particular, it is known to place blocks containing flocculant in a flowing stream so as to allow the block to be eroded with resultant entrainment of the flocculant from the block. For instance it is known to flow the suspension past a block formed from a blend of particulate polymeric flocculant and a salt such as sodium carbonate. In JP-B-4726584 (JP-A-44102922) a foamed block is formed from a polyacrylic ester polymer, alginate polymer, aluminium sulphate, water and a foam-forming material. In EP-A-255,283 blocks are formed of water soluble multivalent metal coagulant and particulate polymeric flocculant, whereby the surface of the blocks is eroded by immersion in a flowing stream to form a solution of the coagulant in which the flocculant particles are entrained. All these blocks can suffer from unsatisfactory erosion properties, for instance due to the formation of a protective layer of polymeric flocculant gel around the blocks. The inclusion of coagulant or a simple salt can reduce this problem but can introduce other problems. For instance in some environments it is undesirable to dissolve multivalent metal salt coagulant into the suspension or other water which is flowing past the blocks.

Water soluble or water swellable polymer particles can be made by reverse phase bead polymerisation followed by drying and recovery of particles or by gel polymerisation followed by drying and comminution. These methods provide a relatively coarse particle size.

It is also known to make extremely fine polymer particles (below 10 µm) in the form of a reverse phase dispersion of the particles in oil by reverse phase emulsion polymerisation. The particles in the initial dispersion contain water but if desired the dispersion can substantially be dehydrated, for instance by distillation of the water from the dispersion.

The resultant stable anhydrous or hydrous polymeric dispersions in oil can be used for various purposes. For instance if the particulate polymer has viscosifying properties then addition of the dispersion to an aqueous liquid will result in thickening of it.

If the reverse phase emulsion polymer particles are swellable but insoluble, for instance as a result of being cross linked polymer particles, the aqueous composition formed by mixing these particles with water will include suspended gel particles and the presence of such particles can impart beneficial flocculation or viscosifying effect. For instance reverse phase cross linked polymer dispersions can be useful as viscosifiers, especially print paste thickeners, and as flocculants, for instance as described in EP 202,780.

A consequence of adding a reverse phase dispersion to an aqueous suspension or other aqueous medium is that the oil of the dispersion is carried into the aqueous medium and this can be undesirable.

It would be desirable to provide a convenient way of facilitating the provision and use of polymer particles while avoiding the introduction of oil into the aqueous system that is being treated. It would be desirable to achieve this while utilising polymer fines. In particular, it would be desirable to provide blocks that can release particulate polymer material efficiently into a flowing stream which erodes the blocks, so that the polymer can then act as a flocculant or viscosifier.

A product according to the invention is a block having a dimension of at least 10 mm and which comprises a water soluble or dispersible wax matrix which is solid at 20° C. and which melts below 250° C. and in which is dispersed water soluble or water swellable polymer particles wherein the dry weight ratio of polymer particles:wax matrix is less than 6:1.

The block can be a granule but usually is in the form of a slab or other larger body for instance having a minimum dimension of at least 20 mm and often 30 mm or 50 mm or more and having a maximum dimension of up to 50 mm, 100 mm, 500 mm or more.

The invention includes a method of making the product comprising forming a dispersion of the polymer particles in the wax matrix at a temperature at which the wax is molten and then cooling and solidifying the wax as a block having a dimension of at least 10 mm. The preferred method of making the dispersion of polymer particles in the wax at the temperature at which the wax is molten comprises providing the polymer particles in the form of powder and blending these with the wax either before or after heating the wax to a temperature at which it is molten.

Usually the block that is formed initially has at least one dimension much larger than 10 mm, for instance at least 20 mm or at least 30 mm. The block is generally formed from the molten dispersion by moulding or casting the molten dispersion. For instance the molten dispersion may be poured on to a surface that will serve as an open mould or it may be moulded under atmospheric pressure or under elevated pressure. For instance it can be made by a process comprising extruding the molten composition. It is also possible to make the block by extruding, cutting or otherwise shaping previously solidified composition to the desired shape and size, provided the wax matrix is sufficiently soft to allow such extrusion, cutting or other shaping.

The invention includes products made by extruding or otherwise comminuting a larger block or sheet of product, for instance by cutting a block or sheet to an appropriate size, and it also includes blocks made initially to the desired dimensions, for instance by casting or moulding.

The dry weight ratio must not be too high as otherwise the dispersion of polymer particles in the molten wax will be such a stiff paste that it cannot conveniently be formed by mixing and then processed into the desired shape of the solid product. Generally the ratio must be less than 6:1 (around 86% polymer particles and 14% wax). The maximum ratio that is suitable for any particular blend will depend on the processing conditions, the nature and size of the polymer particles and the nature of the wax but it is usually not more than 5:1 (83% polymer 17% wax) and often below 4:1 (80% polymer 20% wax). For many products it is not more than 3:1 (75% polymer 25% wax).

From the point of view of manufacture, there is usually no critical lower limit on the ratio, and the product can be made using a significant excess of wax. This is acceptable or desirable when the wax is being provided to the user as a useful component in its own right (and not merely as a diluent or bonding agent). For instance, when it is desired to deliver a large amount (e.g., 10 parts) wax and a small amount (1 part) particulate polymer to a print paste or other system, the product can be formulated to consist of these proportions. However the ratio is usually not less than 1:2 (33% polymer 67% wax) and usually it is not less than 1:1 (50% polymer 50% wax).

The product of the invention is normally substantially anhydrous, and so the polymer particles are normally substantially anhydrous.

The dispersion of polymer particles in molten wax can be made merely by blending the particles as a powder with the molten wax. The powder will usually have a size mainly above 10 µm. The powdered polymer may have been made by any conventional technique, such as gel polymerisation followed by comminution and drying, or reverse phase bead polymerisation followed by drying and separation of the beads from the organic liquid. These methods typically give a particle size 90% by weight in the range 100 to 1000 µm after removal of fines. The powdered particles that are used can be coarse particles in this range but it is often preferred that they are a fraction separated from a mixture of fines and coarser particles. For instance the separated fines may have a size 90% by weight below 100 µm or often lower such as 90% by weight below 70 µm.

When the polymer particles are made by reverse phase polymerisation and supplied as a reverse phase dispersion, the dispersion of the particles in molten wax can be made by forming a hydrous or, preferably, anhydrous reverse phase dispersion of the polymer particles in a volatile organic liquid in which the wax is mixed (as a solution or dispersion), and evaporating the organic liquid by distillation at a temperature above the melting point of the wax. Usually the polymer particles are made by reverse phase polymerisation in volatile liquid in the absence of the wax to produce the polymer dispersion in volatile liquid, the wax is then mixed into the organic liquid, generally at a temperature which is above the melting point of the wax, and the organic liquid is then distilled from the dispersion. The polymerisation may be conducted in conventional manner using an initiator to induce polymerisation, a polymeric stabiliser and/or an emulsifier to promote the formation and stability of the initial dispersion. The particles may be below 10 µm and made as a reverse phase emulsion, or may be coarser (e.g., 90% by weight between 100 µm and 1 mm) and made by reverse phase bead polymerisation.

Accordingly, in this reverse phase method the particles may have a size as low as, for instance, 0.01 µm or as large as 1 mm, but it is usually 0.05 to 50 µm and generally 0.05 to 10 µm.

The initial reverse phase dispersion contains water in the polymer and some or all of the water may be distilled during this distillation of the organic liquid if it has not previously been removed by distillation. Accordingly, the polymer particles in the cooled solid, product are usually substantially anhydrous, for instance containing below 10% water based on the weight of polymer.

Instead of making the particles by reverse phase polymerisation in the volatile liquid, it is possible to mix preformed powder into volatile liquid to form the starting dispersion.

The volatile liquid may be, for instance, an aliphatic or aromatic or cycloaliphatic hydrocarbon, an ether, an ester, or an alcohol, or a mixture of two or more of these, provided it is sufficiently volatile to be removable by distillation at the end of the process and is essentially immiscible with water. Examples are Exxsol D40 (trade mark), toluene, xylene, hexane, cyclohexane, diacetone alcohol, ethyl acetate, butyl acetate, and propylene glycol monomethyl ether.

The wax may be any substance or mixture that is solid at normal temperatures but is liquid at the temperature at which the volatile liquid is removed or, in the process using powdered particles, at a convenient temperature for blending the wax with the particles. Usually the melting point of the wax should be above 30° C. and often above 40° C. It is usually undesirable to have to heat the mixture to too high a temperature and so preferably the melting point of the wax is not above 200° C., and most preferably it is not above 120° C. These are the melting points of the matrix, and so may be the melting point of the single material, when the matrix is formed of a single material, or may be the melting point of the molten blend that forms the matrix.

The wax is preferably selected such that it melts or dissolves or disperses readily under normal conditions of use of the solid product.

The wax having the defined melting point may be a single material or may be a blend of one or more materials that will provide the matrix. Any such blend may include material that does not form part of the melt phase when the total wax blend is molten, but the amount of non-meltable components is usually as low as possible since their inclusion will tend to reduce the amount of polymer particles that can be satisfactorily included in the product form part of the melt phase.

Components that are introduced with the wax and which do not go into the melt phase are excluded when considering the ratio of polymer particles:wax matrix and are usually present in very small amounts, usually less than 20% and usually below 5% by weight of the melt phase. However in some instances larger amounts may be required when the components are to provide a useful effect. For instance multivalent metal coagulant may be included. Materials which appear to be in solution in the melt phase (in that it is not easily possible to determine a heterogeneous phase containing them) can be regarded as part of the wax matrix but again are usually present only in small amounts, below 20% and usually below 5% of the meltable components in the matrix.

Usually the total amount of non-melting material is less than 20% and generally below 5% of the meltable material in the matrix. Additives that may be included within the wax include additives to prevent agglomeration or reduce the melt viscosity or enable the wax to disperse in water. Examples are ethylene oxide-propylene oxide block copolymers e.g. Pluronic 3100, Pluronic 6200 (trade mark).

It may be desirable to include an oil-in-water emulsifier so as to promote the emulsification of the wax into dissolution water. However the osmotic pressure created by the polymer particles imbibing water may be sufficient to disrupt the matrix.

The wax matrix may consist of or comprise water soluble or water dispersible waxes. The amount of such waxes is preferably the predominant amount (above 50% by weight of the matrix) and is preferably above 80% by weight of the matrix. Examples include polyethylene glycols, for example, PEG 1450, PEG 4000, PEG 8000, polyethylene glycol esters, for example, PEG 8000 distearate, fatty acids, for example stearic acid or salts for example sodium or ammonium stearate, amides of fatty acids, for example, stearic acid diethanolamide, fatty alcohols, quaternary fatty waxes such as N-hydroxyethyl ethylene diamine reacted with stearic acid and then quaternised with dimethyl sulphate, or a mixture of two or more of these compounds.

Oil miscible low melting, waxy surfactants (e.g., the materials sold under the trade name "Dobanol") may be used as part or all of the wax matrix.

Instead of or in addition to using hydrophilic or other water soluble or water dispersable waxes alone, it is possible to use hydrophobic, water insoluble, waxes, such as paraffin waxes, polyethylene waxes and silicone waxes. If it is desired to accelerate the rate of dissolution or disruption of the wax matrix, upon addition of the product of the invention to water, materials may be included which will increase the solubility or permeability of the matrix to water. If it is desired to decelerate the rate of dissolution or disruption of the matrix, materials may be included to reduce the hydrophilic nature of the matrix. For instance hydrophobic wax such as stearic acid may be blended into polyethylene glycol or other hydrophilic wax, so as to reduce the rate of solubility.

The water soluble polymer particles are generally formed from water soluble monoethylenically unsaturated monomer or monomer blend, and the water swellable polymer particles are generally made by cross-linking such a polymer, for instance by including a polyethylenically unsaturated cross-linking agent in the polymerisation mixture. Preferably the polymer is acrylic.

The monomers can be anionic or cationic or non-ionic. Blends can be amphoteric but are generally formed from anionic and non-ionic monomers or cationic and non-ionic monomers.

Suitable anionic monomers include (meth) acrylic acid (including alkali metal, ammonium or amine salts) and other ethylenically unsaturated carboxylic or sulphonic acid monomers. Suitable cationic monomers include dialkylaminoalkyl (meth)-acrylamide and—acrylate, generally as quaternary ammonium or acid addition salts, and diallyl dimethyl ammonium chloride ("DADMAC"). Suitable non-ionic monomers include acrylamide and N-vinyl formamide. The monomers and the polymerisation conditions will be chosen in conventional manner having regard to the desired end use of the product, for instance as a flocculant or as a viscosifier.

The blocks of the invention are easy to make and are useful as a convenient intermediate for other products, or they can be used as such. The blocks can have good mechanical properties and can be of predetermined and controlled size and shape.

The blocks of the invention can be cut or otherwise comminuted to form smaller granules, for instance having all dimensions below 5 mm and even below 1 mm. Generally the granules have a size of at least 50 µm often at least 100 µm. These materials can be used as a way of delivering in the form of coarse particles a fine particulate polymer, especially cross linked particulate polymer having a size below 10 µm, as a flocculant or viscosifier. When the polymer particle size is below 10 µm, it is particularly preferred that the polymer particles should be cross linked water swellable but insoluble particles, for instance formed from acrylic acid or a blend with acrylamide. Such products are useful as viscosifiers, especially as print paste viscosifiers, or as flocculants, for instance as cross linked polymeric flocculant as described in EP 202,780.

The preferred products of the invention are blocks, including tablets, or granules having a size of above 10 mm and that can be immersed in a flowing aqueous stream, generally of an aqueous suspension. The blocks are eroded by the flowing stream to release the polymer particles from the wax matrix with dissolution of the polymer and resultant treatment of the flowing stream, which may be a suspension in water of suspended solids. These blocks are easy to make and can give good controlled release of polymer into the aqueous stream and can be non-friable. The rate of release can be selected by, inter alia, choice of the amount and type of wax.

A single self-sustaining block can be immersed in the flowing stream at a chosen point, or a plurality of tablets or other blocks can be immersed in the stream. For instance they can be held in a porous cage or other container.

Generally the blocks have a minimum dimension of at least 20 mm or 30 mm and may have a maximum dimension of, for instance, 100 to 500 mm. Such products can be made using polymer particles that have been made by reverse phase emulsion polymerisation to a size of below 10 µm, as described above, but they are preferably made using particles made by reverse phase bead polymerisation or gel polymerisation and which may have a size up to 1 mm, as described above. However it is particularly preferred to form these products from fines recovered from the production of powdered water soluble or water swellable polymer by bead or gel polymerisation. Thus conveniently at least 50% and often at least 90% by weight of the polymer particles have a size between 10 and 100 µm, often between 10 and 70 µm.

The polymer particles will be chosen having regard to the intended use of the blocks. For instance the polymer particles can be such that the block viscosifies the flowing stream. Preferably however the polymer particles are such that the block causes flocculation in the stream or in a suspension into which the stream flows. Thus the block can serve to promote sedimentation, thickening or dewatering of a suspension. A mixture of polymer types may be used if required, e.g., bridging flocculant.

The polymer can be a relatively low molecular weight coagulant polymer, for instance having an intrinsic viscosity (IV) from 1 to 3 deciliters/gram (dl/g). For instance the polymer can be a homopolymer of diallyl dimethyl ammonium chloride or a salt of a dialkylaminoalkyl (meth) acrylate as a homopolymer or a copolymer with a minor amount of acrylamide, and having IV generally in the range of about 1 or 1.5 to 2.5 or 3 dl/g.

Often, however, the polymer has higher molecular weight, for instance IV above 4 dl/g. In this specification IV is intrinsic viscosity measured by suspended level viscometer at 20° C. in 1 Molar sodium chloride buffered to pH7. It can then serve as, for instance, a bridging flocculant.

Preferred flocculant polymers are anionic polymers, especially polymers of acrylic acid (or a water soluble salt) and acrylamide. Preferred anionic polymers are formed of 10 to 70 weight percent sodium acrylate and 90 to 30 weight percent acrylamide. Typically they have IV from 8 to 18 dl/g. Generally they are made by bead polymerisation or gel polymerisation.

Flocculants formed from a blend of anionic and nonionic monomers, such as those described above, are particularly suitable when the flowing stream that is to be flocculated is a suspension of inorganic material. When the suspension is primarily of organic material the flocculant is generally a cationic flocculant, for instance being formed of a blend of 10 to 80 weight percent, often 10 to 50 weight percent dialkylaminoalkyl acrylate or methacrylate, as a salt, with the balance acrylamide.

The flowing stream that has been treated by polymer that has been eroded from the blocks may be subjected to conventional subsequent processes, such as sedimentation of flocculated solids. The amount and size of the blocks that are required to give a useful effect can easily be determined by routine experiments.

Other products of the invention include agricultural soil conditioners, for instance where the polymer particles are fines of anionic soluble polymer of a type suitable for use as a soil conditioner.

The following is an example.

EXAMPLE 1

70 parts by weight of a 30:70 sodium acrylate-acrylamide copolymer of IV approximately 12 and particle size <150 µm was slurried in 30 parts molten PEG 4000 and cooled to form a flocculant block with dimensions, length 140 mm diameter 90 mm.

In normal practice such a block may be placed in a suspension flowing past the block so as to erode polymer from the block. Alternatively it may be cut up into smaller blocks which may be placed in a cage or other retainer within the flowing suspension. In order to demonstrate the performance of the block in the laboratory, a 2 g portion of the block was placed in a plastic tube with dimensions, length 300 mm, diameter 50 mm. The tube was clamped at an angle of 45° to the horizontal and the flocculant block was retained towards the bottom of the tube by several wire strips.

A slurry of 2% china clay particle size 80% <2 µm in 2 g/l NaCl solution was continuously pumped into the tube at a rate of 500 cm$^3$/min, and allowed to run over the block and out of the tube freely.

To assess the degree of flocculation, at set intervals of time, the solids settlement rate was measured as follows:

A 500 cm$^3$ sample of treated slurry was collected from the bottom of the tube and retained in a 500 cm$^3$ cylinder. The cylinder was inverted once, and the descent of the solids mudline measured between 2 fixed points.

The settlement rate of untreated slurry was approximately 0.7 cm/min. The settlement rates obtained from passing slurry over the block were maintained at >10 cm/min for the passage of over 160 dm$^3$ of slurry. Good flocculation was obtained until the block had completely dissolved.

No gel blocking or excessive dissolution was observed when the block was left to stand in the slurry for up to 16 hours, and no gel blocking was observed when the block was left to dry out for up to 16 hours and then reused, i.e., good flocculation was observed as soon as the flow of slurry was recommenced.

This example demonstrates that flocculant blocks of the invention can be formulated to erode at a controllable rate without contamination of the erosion water with interfering components (such as inorganic coagulants or salts) and without significant gel blocking problems.

EXAMPLE 2

Three kilo blocks are formed by the same technique as in Example 1 from about 60 parts by weight of a 10% sodium acrylate 70% acrylamide copolymer having a particle size of below 150 µm and 40 parts by weight molten polyethylene glycol.

EXAMPLE 3

A block of a cationic coagulant polymer is made by blending 50% molten polyethylene glycol wax with 50% by weight fines from Percol 368 (Percol is a trade mark for a bead polymer of poly DADMAC supplied by Allied Colloids Limited).

We claim:

1. A block having a dimension of at least 10 mm and which comprises water soluble or dispersible wax matrix which is solid at 20° C. and which melts below 250° C. and in which are dispersed water soluble polymer particles which have a size of at least 50% by weight between 10 and 100 µm wherein the dry weight ratio of polymer particles-:matrix is less than 6:1 but more than 1:2 and wherein the polymer has intrinsic viscosity of at least 4 dl/g measured by suspended level viscometer at 20° C. in 1 molar sodium chloride solution buffered to pH 7.

2. A block according to claim 1 in which the polymer particles are particles made by reverse phase polymerization.

3. A block according to claim 1 in which the polymer particles are fines separated from polymer particles made by reverse phase bead polymerization or gel polymerization.

4. A block according to claim 1 in which the polymer particles have a size at least 90% by weight between 10 µm and 100 µm.

5. A product according to claim 1 in which the wax matrix is predominantly polyethylene glycol and the polymer is a water soluble polymer formed from water soluble ethylenically unsaturated monomer or monomer blend.

6. A block according to claim 1 in which the polymer is a polymer of 10 to 70 wt % sodium acrylate and 90 to 30 wt % acrylamide having intrinsic viscosity of 8 to 18 dl/g.

7. A block according to claim 1 in which the said dry weight ratio is from 3:1 to 1:1.

8. A method of treating an aqueous suspension of suspended solids with a polymeric material comprising flowing the suspension past a block having a dimension of at least 10 mm and which comprises water soluble or dispersible wax matrix which is solid at 20° C. and which melts below 250° C. and in which are dispersed water soluble polymer particles which have a size of at least 50% by weight between 10 and 100 μm wherein the dry weight ratio of polymer particles:matrix is less than 6:1 but more than 1:2 and wherein the polymer has intrinsic viscosity of at least 4 dl/g measured by suspended level viscometer at 20° C. in 1 molar sodium chlorid solution buffered to pH 7 and thereby eroding the block and releasing the polymer into the flowing suspension and thereby flocculating the suspended solids.

9. A method according to claim 8 in which the stream is an aqueous suspension, the polymer is a flocculent, and the suspension is flocculated by the polymer which is eroded from the block.

10. A method according to claim 8 in which the polymer particles are particles made by reverse phase polymerization.

11. A method according to claim 8 in which the polymer particles are fines separated from polymer particles made by reverse phase bead polymerization or gel polymerization.

12. A method according to claim 8 in which the polymer particles have a size at least 90% by weight between 10 μm and 100 μm.

13. A method according to claim 8 in which the wax matrix is predominantly polyethylene glycol and the polymer is a water soluble polymer formed from water soluble ethylenically unsaturated monomer or monomer blend.

14. A method according to claim 8 in which the polymer is a polymer of 10 to 70 wt % sodium acrylate and 90 to 30 wt % acrylamide having intrinsic viscosity of 8 to 18 dl/g.

15. A method according to claim 8 in which the said dry weight ratio is from 3:1 to 1:1.

16. A method according to claim 14 in which the flowing suspension is a suspension of inorganic material.

17. A method of making a block having a dimension of at least 10 mm and which comprises water soluble or dispersible wax matrix which is solid at 20° C. and which melts below 250° C. and in which are dispersed water soluble polymer particles which have a size of at least 50% by weight between 10 and 100 μm wherein the dry weight ratio of polymer particles:matrix is less than 6:1 but more than 1:2 and wherein the polymer has intrinsic viscosity of at least 4 dl/g measured by suspended level viscometer at 20° C. in 1 molar sodium chloride solution buffered to pH 7, comprising providing powdered polymer particles by reverse phase bead polymerization or by gel polymerization followed by comminution and drying, recovering a powdered fines fraction from the powdered polymer wherein the fines fraction has a size at least 50% by weight between 10 and 100 μm, blending this powdered fines fraction with the wax matrix at a temperature at which the wax is molten to form a dispersion of the polymer particles in the molten wax matrix and then cooling and solidifying the wax as a block having a dimension of at least 10 mm.

18. A method according to claim 17 in which the polymer particles are particles made by reverse phase polymerization.

19. A method according to claim 17 in which the polymer particles have a size at least 90% by weight between 10 μm and 100 μm.

20. A method according to claim 17 in which the wax matrix is predominantly polyethylene glycol and the polymer is a water soluble polymer formed from water soluble ethylenically unsaturated monomer or monomer blend.

21. A method according to claim 17 in which the polymer is a polymer of 10 to 70 wt % sodium acrylate and 90 to 30 wt % acrylamide having intrinsic viscosity of 8 to 18 dl/g.

22. A method according to claim 17 in which the said dry weight ratio is from 3:1 to 1:1.

* * * * *